United States Patent [19]
Iino et al.

[11] Patent Number: 5,056,890
[45] Date of Patent: Oct. 15, 1991

[54] DISPLAYING APPARATUS FOR A VEHICLE HAVING A PROJECTOR ON THE CEILING OF THE VEHICLE

[75] Inventors: Tadashi Iino; Kunimitsu Aoki; Yoshiyuki Suzuki, all of Susono, Japan

[73] Assignee: Yazaki Corporation, Japan

[21] Appl. No.: 356,626

[22] Filed: May 23, 1989

Related U.S. Application Data

[63] Continuation of Ser. No. 283,252, Apr. 15, 1988, abandoned.

[30] Foreign Application Priority Data

Apr. 16, 1987 [JP] Japan ............................... 62-056665
Apr. 24, 1987 [JP] Japan ............................... 62-061474
Apr. 24, 1987 [JP] Japan ............................... 62-61476

[51] Int. Cl.⁵ ......................... G02B 27/14; G02B 7/18
[52] U.S. Cl. .................................... 359/630; 340/705; 248/487; 359/876
[58] Field of Search ................... 350/174, 601, 636; 340/705; 248/487

[56] References Cited

U.S. PATENT DOCUMENTS

| | | | |
|---|---|---|---|
| 3,503,146 | 3/1970 | Woplin | 350/174 |
| 3,511,465 | 5/1970 | Morion | 350/174 |
| 3,552,828 | 1/1971 | Lawrence et al. | 350/174 |
| 3,620,601 | 11/1971 | Waghorn et al. | 350/174 |
| 3,666,887 | 5/1972 | Freeman | 350/174 |
| 3,887,273 | 6/1975 | Griffiths | 350/174 |
| 3,945,716 | 3/1976 | Kinder | 350/174 |
| 4,582,389 | 4/1986 | Wood et al. | 350/174 |
| 4,600,271 | 7/1986 | Boyer et al. | 350/174 |
| 4,637,694 | 1/1987 | Gastaneda | 248/487 |
| 4,711,544 | 12/1987 | Iino et al. | |
| 4,714,320 | 12/1987 | Banbury | |
| 4,746,206 | 5/1988 | Kusztos et al. | |
| 4,769,633 | 9/1988 | Ellis | 350/174 |
| 4,787,711 | 11/1988 | Suzuki | |
| 4,804,836 | 2/1988 | Iino | |
| 4,806,904 | 2/1989 | Watanuki | |
| 4,831,366 | 5/1989 | Iino | |
| 4,837,551 | 6/1988 | Iino | |
| 4,886,328 | 12/1989 | Iino | |
| 4,908,611 | 3/1990 | Iino | |

FOREIGN PATENT DOCUMENTS 2154020 8/1985 United Kingdom .
2154757 9/1985 United Kingdom .
2182456 5/1987 United Kingdom .

Primary Examiner—Jon W. Henry
Attorney, Agent, or Firm—Wigman & Cohen

[57] ABSTRACT

A displaying apparatus for a vehicle to project a pattern to be displayed of an indicator on a half mirror disposed in front of a driver's seat such that a driver of the vehicle sees the pattern overlapping views outside a front windshield of the vehicle. The displaying apparatus comprises a projector for projecting the pattern. The projector includes the indicator, etc., and is received within a case which is provided to a ceiling in the interior of the vehicle to accommodate a room lamp. The half mirror is fitted to a fitting device installed on a dashboard of the vehicle such that an angle of the half mirror is freely set. The half mirror is set on the dashboard at an angle in a range between 100 and 120 deg. the angle being formed toward the front windshield from a horizontal line (0 deg) extending to the driver.

6 Claims, 8 Drawing Sheets

FIG.12
FIG.13
FIG.14
FIG.15
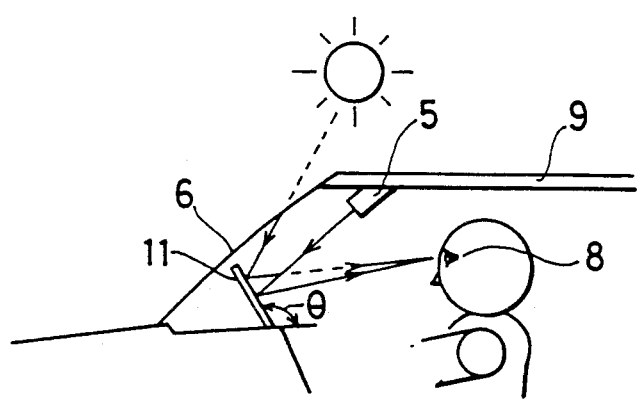
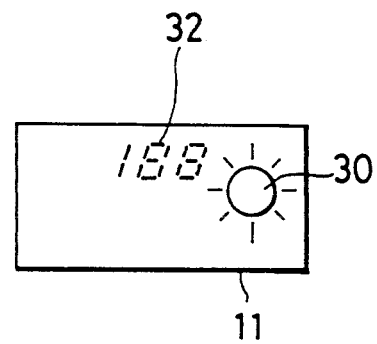
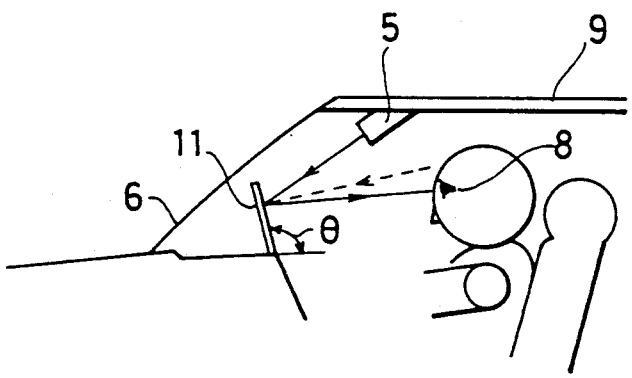
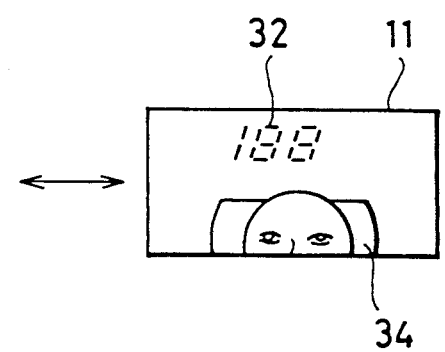

DISPLAYING APPARATUS FOR A VEHICLE HAVING A PROJECTOR ON THE CEILING OF THE VEHICLE

This is a continuation of co-pending application Ser. No. 07/283,252 filed on Apr. 15, 1988 now abandon.

BACKGROUND OF THE INVENTION

1. Field of the Invention

The present invention relates to a displaying apparatus used for a vehicle to project patterns on a half mirror or on a front windshield of the vehicle such that a driver of the vehicle may see the patterns overlapping outside views.

2. Description of the Prior Art

Generally in a vehicle, indicators such as a speedometer and a clock are disposed on a dashboard such that a driver of the vehicle directly see patterns displayed on the indicators.

Also, there is a so-called headup displaying apparatus which has been recently developed to project patterns on a half mirror or on a front windshield of the vehicle such that the driver see the projected patterns (virtual images) overlapping outside views. The headup displaying apparatus is adequate for the safety driving because the driver can see the patterns without changing his eyes during the driving.

FIG. 1 shows an example of the headup displaying apparatus for a vehicle according to a prior art. In the figure, a dashboard 1 incorporates a projector 105 which comprises a display device 102, a light source 103, lens 104, etc. The display device 102 is constituted with, for instance, liquid crystal cells. Light irradiates the back of the display device 102, and a pattern to be displayed of the display device 102 is enlarged with the lens 104 and projected on a half mirror 101. The half mirror 101 reflects a virtual image 107 of the pattern toward a driver 8.

According to this displaying apparatus of the prior art, the projector 105 including the display device 102 is received in the dashboard 1 which is usually occupied by various instruments and wiring so that a limited space remains for the projector 105. Therefore, the dashboard 1 shall be designed to be sufficiently large to accommodate the projector 105 in the dashboard 1, thus reducing an interior space of the vehicle.

Further, through an opening formed on the top surface of the dashboard 1 to project a pattern as shown in FIG. 1, strong sun light passing through a front windshield is made incident to the projector 105 to destroy the display device 102 composed of the liquid crystal cells.

To direct the virtual image 107 on the half mirror 101 toward the driver 8 who is sitting in a particular posture and having a particular physical constitution, as illustrated in FIGS. 2a and 2b the half mirror 101 is rotated in a right-and-left direction around a vertical axis Y and in a back-and-forth direction around a horizontal axis X to adjust an angle of the half mirror 101. After adjusting the half mirror 101, thumbscrews fitted to the horizontal and vertical axes X and Y respectively are tightened to fix the axes. Namely, the two thumbscrews shall be manipulated before and after the adjustment so that the adjusting operation is bothersome, the number of parts increased, the apparatus as a whole complicated, long time and many processes required for manufacturing and assembling the apparatus, and the cost increased.

SUMMARY OF THE INVENTION

An object of the present invention is to provide a displaying apparatus for a vehicle, which realizes an effective use of an interior space of the vehicle.

Another object of the present invention is to provide a displaying apparatus for a vehicle, which prevents strong light from destroying a projector of the displaying apparatus.

Still another object of the present invention is to provide a displaying apparatus for a vehicle, which improves the visibility of a displayed image.

Still another object of the present invention is to provide a displaying apparatus for a vehicle, which simplifies an adjusting operation of the angle of a half mirror on which an image is displayed to reduce the number of parts necessary for adjusting the angle.

According to one aspect of the present invention, a case for receiving a room lamp is fitted to a ceiling in the interior of a vehicle, and a projector which comprises a display device, etc., for projecting a pattern to be displayed is accommodated in the case.

Namely, the projector of a headup displaying apparatus is arranged in the case for receiving the room lamp, and the case is attached to the ceiling of the vehicle room. The projector projects an image on a reflector located in front of a driver of the vehicle.

Since the projector is fitted to the ceiling, a limited space in the vehicle can be effectively used. Further, fitting stays and wire harnesses associated with the room lamp can be commonly used for the projector so that the number of parts will be reduced, fitting work simplified, and the cost reduced. Moreover, strong outside light is not made incident to the projector to improve the reliability and durability of the display device of the projector.

According to another aspect of the present invention, a reflector fitting device is provided for a displaying apparatus of a vehicle. The reflector fitting device comprises a vertical supporting shaft, a horizontal shaft member with a hole into which the vertical supporting shaft is rotatably engaged, a reflector fitting body rotatably and axially slidably fitted to the horizontal shaft member, a regulating member axially slidably fitted to the horizontal shaft member between the vertical supporting shaft and the reflector fitting body, and a thumbscrew fastened to a threaded portion at an end of the horizontal shaft member. When the thumbscrew is tightened, the regulating member and the reflector fitting body are held and fixed between the vertical supporting shaft and the thumbscrew.

By unfastening the thumbscrew, a fixed state of the regulating member and reflector fitting body between the vertical supporting shaft and the thumbscrew is released so that the reflector fitting body will rotate around the horizontal shaft member which is also rotatable around the vertical supporting shaft. Thus, a reflector fitted to the reflector fitting body can be adjusted in both back-and-forth and right-and-left directions.

After the adjustment of the reflector, the thumbscrew is fastened to fix the regulating member and reflector fitting body between the vertical supporting shaft and the thumbscrew, thus immobilizing the rotation of the reflector fitting body with respect to the horizontal shaft member and the rotation of the horizontal shaft member with respect to the vertical shaft to fix the angle of the reflector.

According to still another aspect of the present invention, a displaying apparatus for a vehicle comprises a projector fitted to a ceiling of the vehicle and a half mirror arranged on a dashboard of the vehicle to reflect an image projected from the projector toward a driver of the vehicle, and the half mirror on the dashboard is set at an angle in a range of 100 to 120 deg, the angle being formed between a horizontal line (0 deg) extending from the dashboard toward the driver and a front windshield.

Since the half mirror on the dashboard is set at an angle in the range mentioned in the above, strong outside light such as sunlight is not reflected by the half mirror so that the driver is not bothered with it. Further, a face of the driver or interior objects are not reflected with the half mirror. As a result, the driver may not be dazzled with the outside light, face and interior objects, and the visibility of an image from the projector is not deteriorated.

These and other objects, features and advantages of the present invention will become apparent from the following descriptions of preferred embodiments taken in conjunction with the accompanying drawings.

BRIEF DESCRIPTION OF THE DRAWINGS

FIGS. 12 to 15 are explanatory views showing relations between the visibilities, displaying states and fitting angles of a half mirror.

DETAILED DESCRIPTION OF THE PREFERRED EMBODIMENTS

Figure 1:
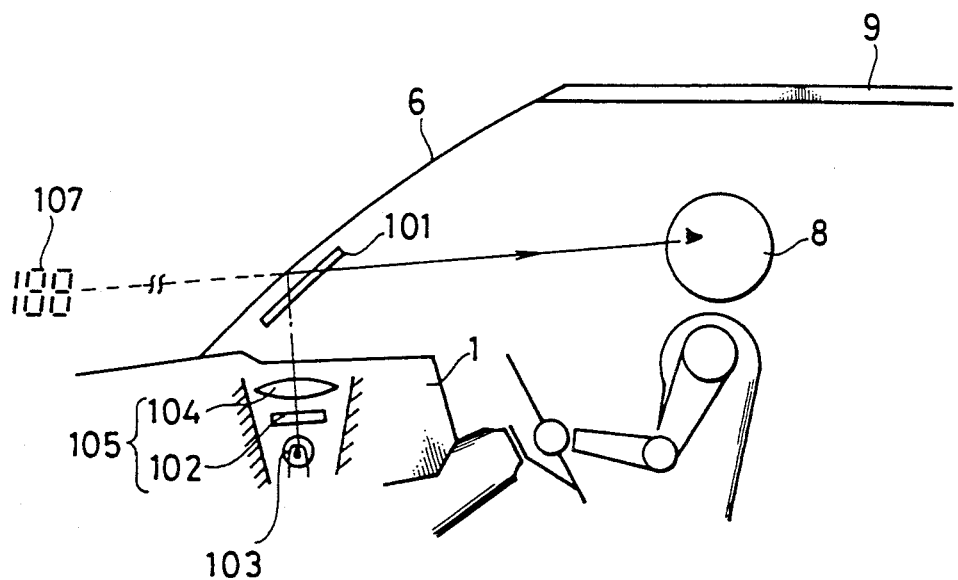
FIG. 1 is an explanatory view schematically showing a displaying apparatus for a vehicle according to a prior art.
Figure 2A:
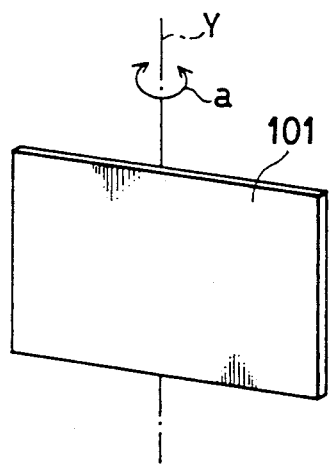
FIGS. 2a and 2b are views schematically showing a back-and-forth rotation and a right-and-left rotation respectively of a half mirror of the displaying apparatus shown in FIG. 1.
Figure 2B:
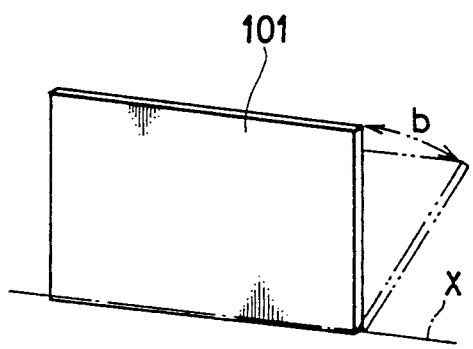
Figure 3:
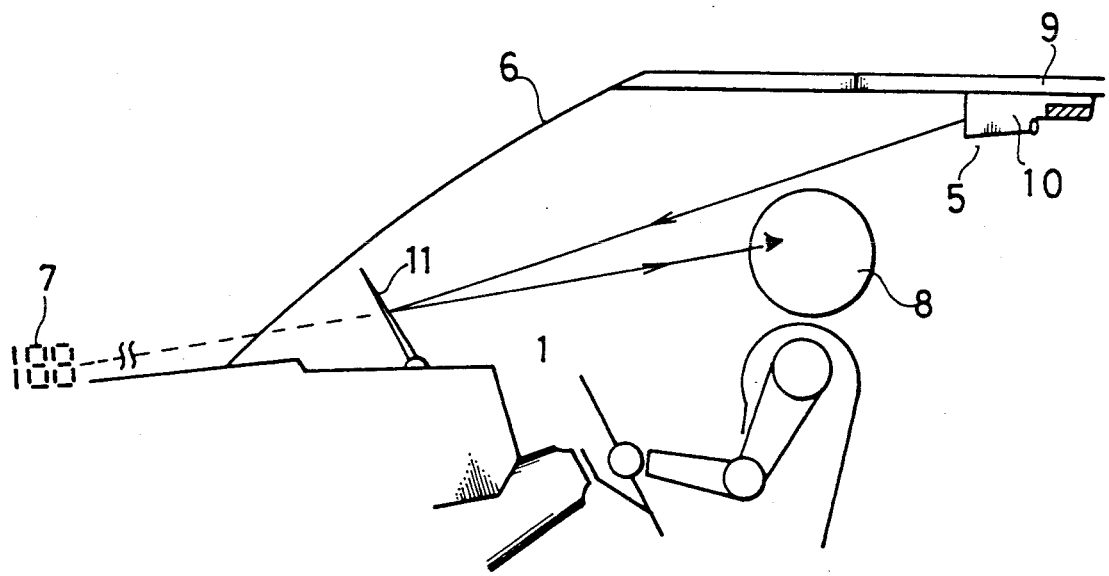
FIG. 3 is a general view showing the constitution of a displaying apparatus for a vehicle according to an embodiment of the present invention.

FIG. 3 shows a general arrangement of the embodiment of the present invention. In the figure, a case 10 for accommodating a room lamp 14 is fixed to the center of a ceiling 9 in the interior of a vehicle. Within the case 10, there is arranged a projector 105 for projecting a pattern to be displayed. A half mirror 11 is slantly disposed on a dashboard 1 in front of a driver 8 such that an end of the half mirror 11 is inclined toward a front windshield 6.

Figure 4:
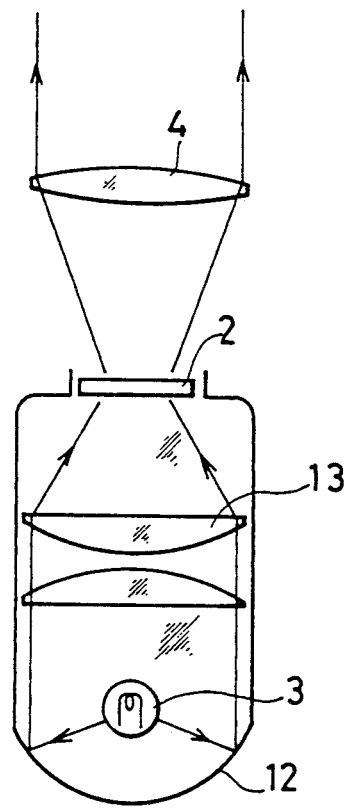
FIG. 4 is a view schematically showing a projector of the embodiment shown in FIG. 3.

As shown in FIG. 4, the projector 105 comprises a display device 2 having liquid crystal cells, a light source 3 for irradiating the back of the display device 2, a light collecting mirror 12 for effectively and forwardly collecting light from the light source 3, a light collecting lens 13 for collecting the light from the light collecting mirror 12 toward the display device 2, and a lens 4 for enlarging an image 7 of the pattern to be displayed to a required size. The projector 105 is fixed in the room lamp case 10 to face the front windshield 6.

Figure 5:
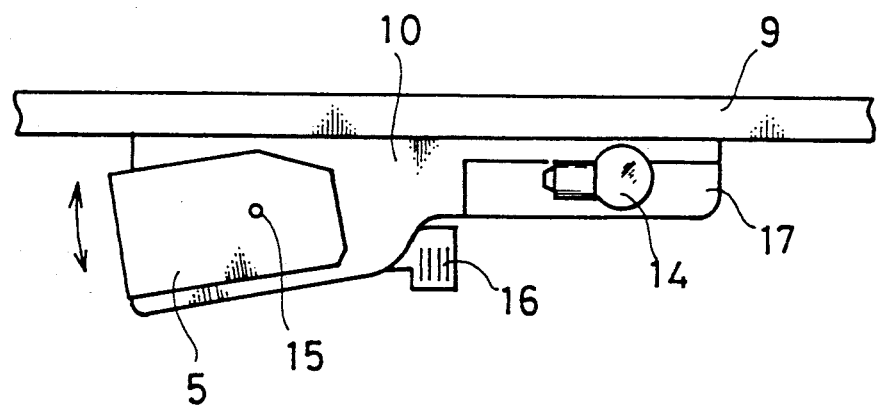
FIG. 5 is a side view showing a fitting portion of the projector of the embodiment shown in FIG. 3.
Figure 6:
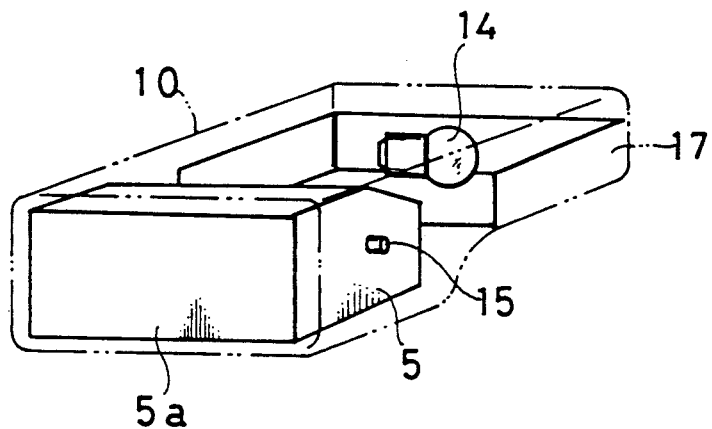
FIG. 6 is a perspective view showing the fitting portion of the projector of the embodiment shown in FIG. 3.

FIGS. 5 and 6 are a side view and a perspective view respectively, showing the room lamp 14 and the projector 5 which are fixed to the ceiling 9. The projector 5 is pivotable around a supporting shaft 15 which is fitted to the case 10 at a front portion of the case 10. A surface 5a of the projector 5 for projecting the pattern to be displayed is exposed outside the case 10. The room lamp 14 is fitted to a rear portion of the case 10 and is turned ON and OFF with a knob 16. A numeral 17 represents a lamp cover.

Figure 7:
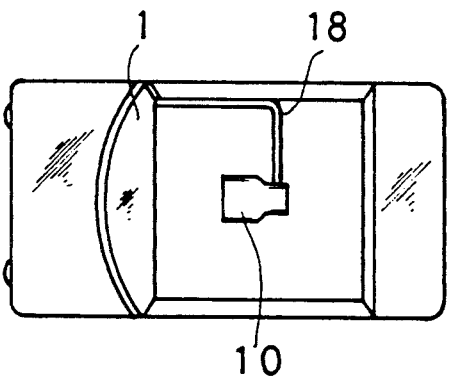
FIG. 7 is a plan view showing where the projector of the embodiment is fitted.
Figure 8:
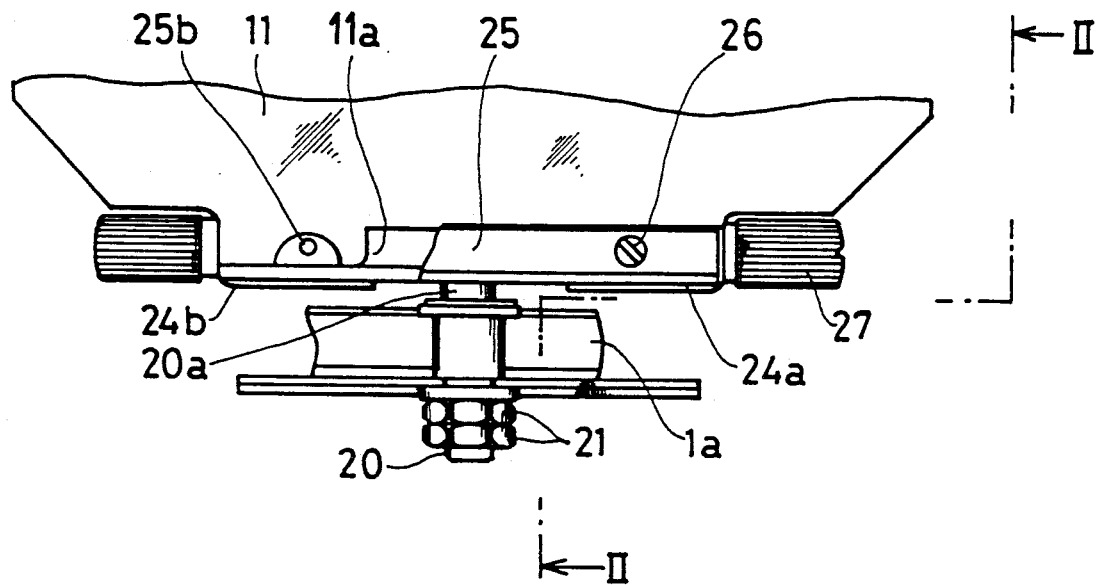
FIG. 8 is a front view partly omitted showing a half mirror fitting device according to the embodiment shown in FIG. 3.
Figure 9:
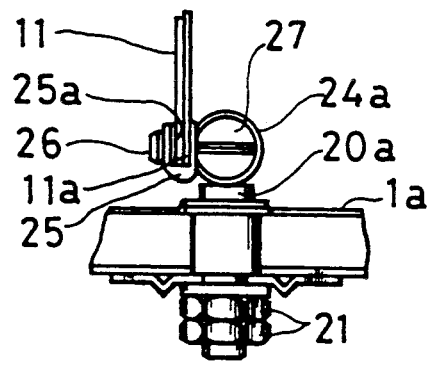
FIG. 9 is a sectional view taken along a line II—II of FIG. 8.

FIG. 7 is a plan view showing positions of the projector 5 and room lamp 14 fitted to the ceiling 9. By commonly using a ceiling harness 18 extending from a battery in an engine room to the room lamp 14, controlling and driving signals and power are transmitted to the projector 5.

As shown in FIG. 3, light from the projector 5 is projected on the half mirror 11 on the dashboard 1 to form a virtual image 7. The driver 8 sees the virtual image 7 overlapping outside views.

Although the virtual image 7 has been formed on the half mirror 11 according to the embodiment shown in FIG. 3, the virtual image 7 may be formed on the front windshield 6 by arranging a total reflection mirror on the dashboard 1 to reflect light toward the front windshield 6. It is also possible to provide another mirror to the ceiling 9 in front of the projector 5 to reflect light from the projector 5 toward the half mirror 11 on the dashboard 1 or toward the front windshield 6.

Although the liquid crystal cells have been used for the display device of the projector in the above-mentioned embodiment, a spontaneous light emitting display device such as a fluorescent display tube may be used for the display device of the projector.

A fitting device of the half mirror 11 of the displaying apparatus shown in FIG. 3 will be described with reference to FIGS. 8 to 11.

A fitting device 19 of the half mirror 11 comprises a vertical supporting shaft 20 having a step portion 20a. The vertical supporting shaft 20 is fixed upright to the dashboard 1 on the driver's side of the front windshield 6 with a fitting nut 21. A horizontal shaft member 22 has at its central part a large diameter portion 22' having a hole 22a into which the vertical supporting shaft 20 is inserted. The horizontal shaft member 22 also has at its both ends small diameter portions 22b and 22c. At the step portion 20a of the vertical supporting shaft 20, the horizontal shaft member 22 is rotatably supported.

A numeral 23 represents a cylindrical regulating member which is axially slidably fitted to the large diameter portion 22' of the horizontal shaft member 22. In the middle of the regulating member 23, there is formed a hole 23a which aligns with the hole 22a of the horizontal shaft member 22. The vertical supporting shaft 20 is rotatably inserted to the hole 23a. The length of the regulating member 23 is larger than that of the large diameter portion 22' of the horizontal shaft member 22.

Numerals 24a and 24b represent reflector fitting bodies. The reflector fitting body 24a has a through hole 24a₁ into which the small diameter portion 22b of the horizontal shaft member 22 is rotatably inserted, while the reflector fitting body 24b has a hole 24b₁ into which the small diameter portion 22c of the horizontal shaft member 22 is rotatably inserted.

The reflector fitting bodies 24a and 24b are connected to each other with a connecting bar 25 having a recess 25a to which a lower edge 11a of the half mirror 11 is engaged. The connecting bar 25 with the half mirror 11 engaged thereto is fixed to the reflector fitting bodies 24a and 24b with screws 26 which pass through holes 25b of the connecting bar 25 and are fastened to holes 24a₂ and 24b₂ of the reflector fitting bodies 24a and 24b. Thus, the half mirror 11 is fixed to the reflector fitting bodies 24a and 24b which are connected to each other with the connecting bar 25.

A numeral 27 represents a thumb nut as a manipulating member fastened to a threaded portion 22b₁ provided at an end of the small diameter portion 22b.

Figure 10:
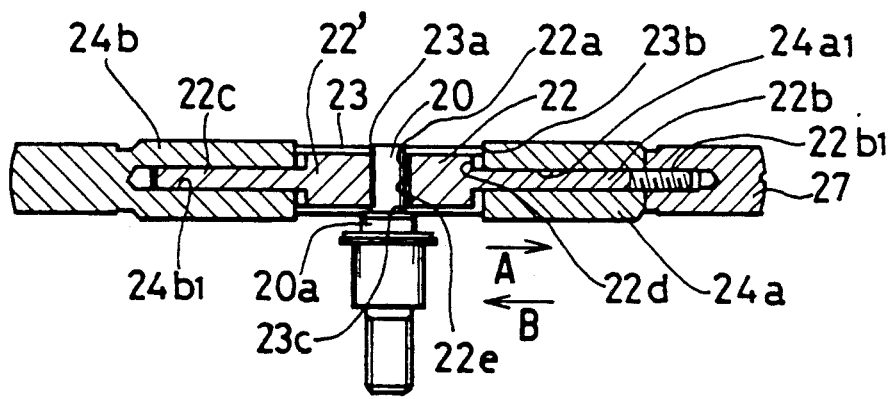
FIG. 10 is a longitudinal section of the fitting device shown in FIG. 8.
Figure 11:
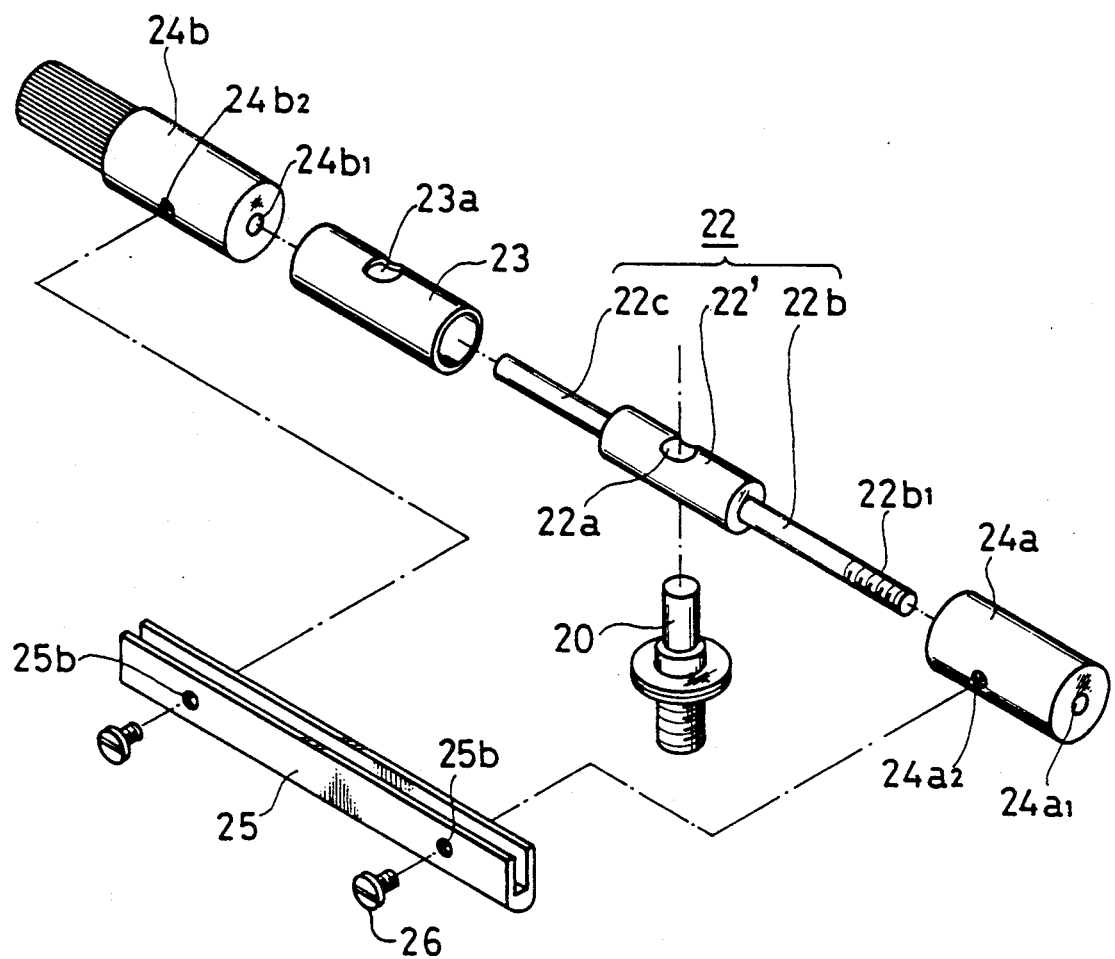
FIG. 11 is an exploded perspective view of the fitting device.

In FIG. 10, if the thumb nut 27 is tightened, the reflector fitting body 24a is pushed by the thumb nut 27 in the direction of an arrow B to abut against an outer end 23b of the regulating member 23. Accordingly, the regulating member 23 is also moved in the direction B so that an internal periphery 23c of the hole 23a abuts against an outer periphery of the vertical supporting shaft 20. Then, the movements in the direction B of the regulating member 23 and reflector fitting body 24b are stopped. If the thumb nut 27 is further tightened, the horizontal shaft member 22 moves in the direction of an arrow A so that an inner periphery 22e of the hole 22a abuts against an outer periphery of the vertical supporting shaft 20. In this way, by strongly tightening the thumb nut 27, the reflector fitting body 24a and regulating member 23 are held and fixed between the vertical supporting shaft 20 and the thumb nut 27 so that the rotation of the horizontal shaft member 22 with respect to the vertical supporting shaft 20 and the rotation of the reflector fitting body 24a with respect to the horizontal shaft member 22 are immobilized. Therefore, the right-and-left and back-and-forth movements of the half mirror 7 fitted to the reflector fitting bodies 24a and 24b through the connection bar 25 are made impossible.

If the thumb nut 27 is unfastened, the fixed state of the reflector fitting body 24a and regulating member 23 between the thumb nut 27 and the vertical supporting shaft 20 is released so that the reflector fitting bodies 24a and 24b may be rotated around the small diameter portions 22b and 22c of the horizontal shaft member 22, and the horizontal shaft member 22 around the vertical supporting shaft 20. Then, the half mirror 11 is movable in the back-and-forth and left-and-right directions to adjust the angle of the half mirror 11.

After that, the thumb nut 27 is again fastened to hold and fix the reflector fitting body 24a and regulating member 23 between the vertical supporting shaft 20 and the thumb nut 27 to fix the half mirror 11 at the adjusted angle.

As described in the above, by manipulating the single thumb nut 27, the rotation of the horizontal shaft member 22 with respect to the vertical supporting shaft 20 and the rotation of the reflector fitting body 24a with respect to the horizontal shaft member 22 are allowed and prohibited to adjust the angle of the half mirror 11.

Although the two reflector fitting bodies 24a and 24b have been used for stabilizing the half mirror 11 in the embodiment mentioned in the above, the reflector fitting body 24b is not necessarily needed but only one reflector fitting 24a is sufficient to set the half mirror 11.

Referring now to FIGS. 12 through 15, the adjustment of a set angle of the half mirror 11 of the displaying apparatus according to the embodiment shown in FIG. 3 will be described. In the embodiment mentioned in the above, the driver 8 can see the virtual image 7 on the half mirror 11 but there is a chance that the visibility of the image is deteriorated by external conditions such as strong light other than the light from the projector 5.

For instance, if light from outside objects such as the sky or the sun 30 other than an image 32 to be displayed comes in a view field of the half mirror 11, the visibility of the image 32 is excessively deteriorated, and the driver 8 is dazzled with such outside light to endanger the safety driving.

As shown in FIG. 15, if a face 34 of the driver 8 or a seat of the vehicle reflects on the half mirror 11, it also bothers the driver and deteriorates the visibility of the image 32.

Such problems are caused partly due to the set angle of the half mirror 11. The problem shown in FIG. 13 tends to be caused when a set angle $\theta$ of the half mirror 11 with respect to a horizontal plane is large as shown in FIG. 12 (i.e., the half mirror 11 is close to the horizontal plane), while the problem of FIG. 15 tends to be caused when the set angle $\theta$ is small as shown in FIG. 14 (i.e., the half mirror 11 is close to a vertical line).

By using general expressions, relations between the set angle of the half mirror 11 and the visibility will be described.

Figure 16:
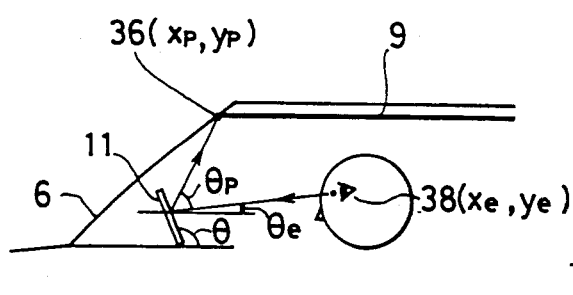
FIGS. 16 to 22 are explanatory views showing the principle of how to set the half mirror according to the present invention.
Figure 17:
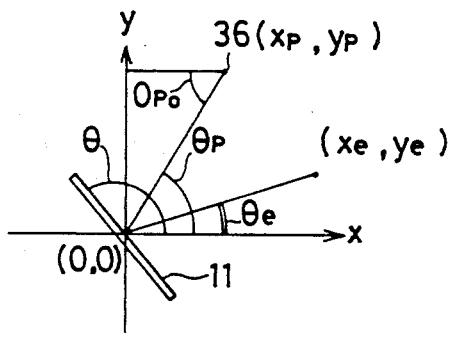

A general expression of the set angle $\theta$ of the half mirror 11 will be found according to FIGS. 16 and 17. In FIG. 16, a numeral 11 represents the half mirror, $\theta$ the set angle, (Xe, Ye) coordinates of an eye point 38 of the driver, (Xp, Yp) coordinates of a fitting position of the projector 105 or of a projecting light emitting position, an alternate long and short dash line a perpendicular of a reflecting surface of the half mirror 11, and $\theta_e$ an angle which is made when the eye point 38 is not in a plane containing a reflecting point (x, y)=(0, 0) of the projected light. (Generally, the angle $\theta_e$ is caused when the reflector is arranged on a dashboard.)

The projected light from the position (Xp, Yp) is reflected at the reflecting point (x, y)=(0, 0) of the reflector toward the eye point 38. At this time, a relation between an incident angle and a reflection angle of the half mirror 11 will be "incident angle=reflection angle" according to a law of reflection, and expressed as follows:

$$\text{incident angle} = \text{reflection angle} = (\theta_p + \theta_e)/2$$

Therefore, the set angle $\theta$ of the half mirror 11 will be expressed as follows:

$$\theta = \{(\theta_p + \theta_e)/2\} + \theta_e + \pi/2 \qquad (1)$$
$$= \tfrac{1}{2}(\theta_p - \theta_e + 2\theta_e + \pi)$$
$$= \tfrac{1}{2}(\theta_p + \theta_e + \pi)$$

From FIGS. 16 and 17, $\theta_p$ is an alternate-interior angle of $\theta_{po}$ so that the following is established:

$$\theta_p = \theta_{po} \quad (2)$$

$$\tan\theta_{po} = Yp/Xp$$

$$\therefore \theta_{po} = \tan^{-1} Yp/Xp \quad (2)'$$

From (2) and (2)', the following is established:

$$\theta_{po} = \theta_p = \tan^{-1} Tp/Xp \quad (3)$$

$\theta_e$ is expressed as follows:

$$\tan\theta_e = Ye/Xe$$

$$\therefore \theta_e = \tan^{-1} Ye/Xe \quad (4)$$

From (1), (3), and (4), the set angle $\theta$ of the half mirror 11 can be generally expressed as follows:

$$\theta = (\theta_p + \theta_e + \pi)/2$$

where $\theta_p = \tan^{-1} Yp/Xp$ \quad (I)

$$\theta_e = \tan^{-1} Ye/Xe.$$

Conditions not causing unnecessary images on the half mirror 11 will be considered.

a) Angles not causing the problem of FIGS. 12 and 13

An angular range of the half mirror 11 in which outside light such as light of the sky (the sun 30) is not reflected with the half mirror 11 toward the driver is on the inner side (vehicle room side) of an intersection between the ceiling 9 and the front windshield 6 as shown in FIGS. 16 and 17. This intersection is considered as a fitting position of the projector or as a position of the projecting light emitting point (Xp, Yp).

Figure 18:
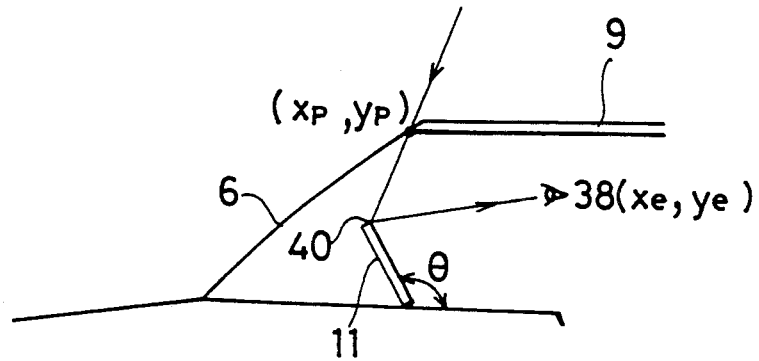

When the set angle $\theta$ of the half mirror 11 is increased from 0 deg, the outside light such as the light of the sky (the sun 30) is started to be reflected by the half mirror 11 at an upper end of the half mirror 11 as shown in FIG. 18.

Figure 19:
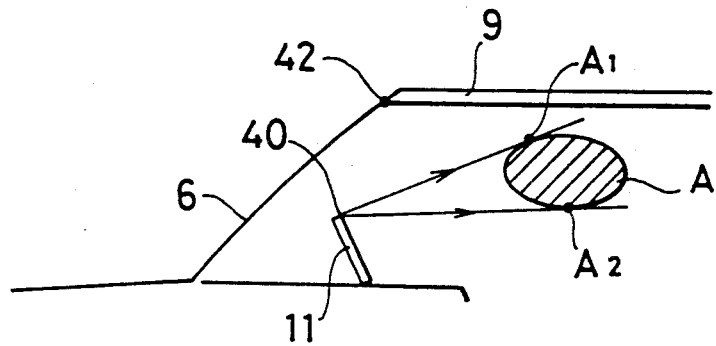

Since the eye point (Xe, Ye) differs depending on individuals, a driver eye range (JASO Z008) is used to rewrite the reflecting point 40 of the half mirror 11 op to the eye point 38 as shown in FIG. 19.

In FIG. 19, an eye range A (a range of eye points) is used so that two tangential lines are drawn from the reflecting point 40 of the half mirror 11 to the eye range A where contact points with the tangential lines are represented with A1 and A2 which will be referred to as the upper eye point A1 and the lower eye point A2.

The set angle $\theta$ of the half mirror 11 will have different values when reflected light from an upper edge portion 42 of the front windshield 6 is made incident to the upper eye point A1 and when the same is made incident to the lower eye point A2. Namely, the set angle $\theta$ for the upper eye point A1 is greater than that for the lower eye point A2. The set angle $\theta$ for the upper eye point A1 will be represented with $\theta$A1 and that for the lower eye point A2 with $\theta$A2. Then the following will be established:

$$\theta A1 > \theta A2$$

Therefore, the driver may select the set angle $\theta$ between $\theta$A1 and $\theta$A2. Namely, the maximum angle of the set angle $\theta$ of the half mirror 11 will be $\theta$A1.

b) Angles not causing the problem of FIGS. 14 and 15

When the set angle $\theta$ of the half mirror 11 is increased from 0 deg, a lower edge of the half mirror 11 will reflect the driver to the last.

Figure 20:
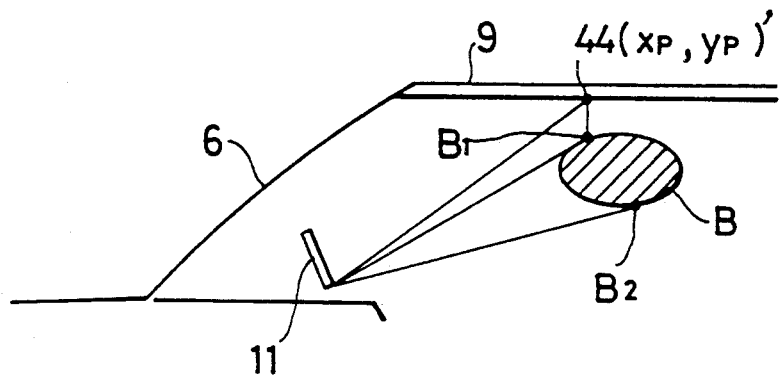

Similar to the item a) mentioned in the above, an eye range B (JASO Z008) has an upper eye point B1 and a lower eye point B2 which are contact points of tangential lines extending from a reflecting point of the half mirror 11. A range in which the face of the driver is not reflected with the half mirror 11 is on the front side (front windshield side) of an intersection 44 (Xp, Yp)' between a perpendicular from the upper eye point B1 and the ceiling 9 as shown in FIG. 20.

As in the case of the item a), the set angle $\theta$ for the upper eye point B1 will be represented with $\theta$B1 and that for the lower eye point B2 with $\theta$B2. Then the following will be established:

$$\theta B1 > \theta B2$$

Therefore, the driver may select the set angle $\theta$ between $\theta$B1 and $\theta$B2. Namely, the minimum angle of the set angle $\theta$ of the half mirror 11 will be $\theta$B2.

According to the items a) and b) described in the above, a range of the set angle $\theta$ of the half mirror 11 is $\theta A1 \geq \theta \geq \theta B2$. This is a range in which the half mirror 11 reflects the ceiling at the intersection 44 from the upper edge portion 36 and in which angles at which the driver can see the image 32 without the influences of outside light and driver's face are included.

Therefore, the set angle $\theta$ of the half mirror 11 shall be within the range of $\theta A1 \geq \theta \geq \theta B2$. From an inconvenient state of the half mirror (for instance, the angle of the half mirror 11 has been changed by another driver or by cleaning work of the dashboard and front windshield), the driver can quickly set the angle of the half mirror 11 to an optimum angle for him by operating the half mirror fitting device 19 described before.

By substituting values actually measured in a particular vehicle for the general expression (I), the set angle $\theta$ of the half mirror 11 has been calculated.

In measuring the values, the half mirror 11 has been set on the dashboard at a position 730 mm in distance from an intersection between an eye range reference line X-X and an eye range reference line Z—Z and 90 mm in height from the dashboard. The reflector width of the half mirror 11 is 60 mm, and an inclination of the front windshield is about 35°.

(1) Upper eye range a) With reference to FIGS. 16 and 17, the upper eye range A1 is as follows:

(Xp, Yp) = (360, 260)

(Xe, Ye) = (690, 135)

Figure 21:
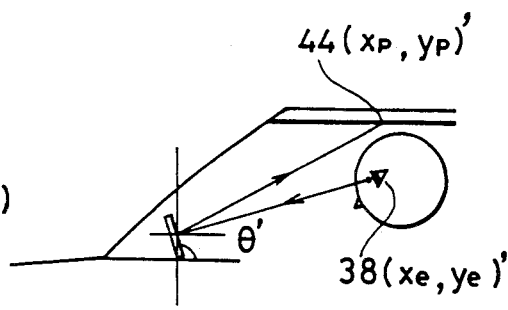
Figure 22:
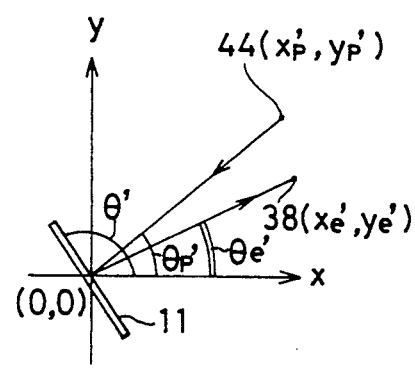

$\theta = (\theta_p + \theta_e + \pi)/2$ $\theta_p = \tan^{-1} Yp/Xp = \tan^{-1} 260/360$ $\theta_e = \tan^{-1} Ye/Xe = \tan^{-1} 135/670$ $\theta A1 = (\tan^{-1} 260/360 + \tan^{-1} 135/670 + \pi)/2$
     $= 113.6$ deg b) With reference to FIGS. 21 and 22, the upper eye range B1 will be as follows:

$$(Xp, Yp)' = (670, 325)$$

$$(Xe, Ye)' = (670, 190)$$

$$\begin{aligned}\theta B1 &= (\tan^{-1} 325/670 + \tan^{-1} 190/670 + \pi)/2 \\ &= 110.85 \text{ deg}\end{aligned}$$

(2) Lower eye range a) With reference to FIGS. 16 and 17, the lower eye range A2 is as follows:

$$(Xp, Yp) = (360, 260)$$

$$(Xe, Ye) = (720, 20)$$

$$\begin{aligned}\theta A2 &= (\tan^{-1} 260/360 + \tan^{-1} 20/720 + \pi)/2 \\ &= 108.7 \text{ deg}\end{aligned}$$

b) With reference to FIGS. 21 and 22, the lower eye range B2 will be as follows:

$$(Xp, Yp)' = (670, 325)$$

$$(Xe, Ye)' = (720, 75)$$

$$\begin{aligned}\theta B2 &= (\tan^{-1} 325/670 + \tan^{-1} 75/720 + \pi)/2 \\ &= 105.9 \text{ deg}\end{aligned}$$

From the above, the following is established:

$$105.9 \text{ deg} \leq \theta \leq 113.6 \text{ deg}$$

Within this range of the set angle $\theta$ of the half mirror 11, the image 32 can be seen on the half mirror 11 from any eye point 38 of the 99% eye range (JASO Z008) without causing the disadvantages shown in FIGS. 12, 13, 14 and 15.

Since the inclination of the front windshield, the height of the dashboard, the height of the ceiling, etc., differ depending on vehicles, the angle range mentioned in the above will be preferably as follows:

$$100 \text{ deg} \leq \theta \leq 120 \text{ deg}$$

If the set angle $\theta$ of the half mirror 11 is limited within this range, individual drivers can select optimum angles for them within the range of 20 deg.

By setting the angle range, an optical axis of the projector is projected on the half mirror 11 within a range from the upper end 36 of the front windshield to the fitting portion 44 of the projector 5 so that the fitting position and angular range of the projector 5 can be determined.

In summary, according to the present invention, a projector of a headup displaying apparatus for a vehicle is arranged inside a case of a room lamp fitted to a ceiling of the interior of the vehicle such that an image is projected from the ceiling to a reflector disposed in front of a driver.

Therefore, a space not bothering the driver can be used for fitting the projector so that a limited interior space of the vehicle can be effectively used. In addition, existing stays and harnesses for the room lamp can be commonly used for the projector so that the number of parts will be reduced, fitting work simplified, and the cost reduced. Since strong outside light does not enter into the projector, a display device of the projector will not be influenced with the outside light.

Further, since the angle of a half mirror installed on a dashboard is set as mentioned in the above, strong outside light such as sunlight is not reflected with the half mirror toward a driver. Moreover, the face of the driver or the interior of the vehicle is also not reflected with the half mirror so that the driver is not dazzled with it, and the visibility of an image to be displayed is not deteriorated.

In addition, only by turning one thumb nut, the half mirror can be adjusted in the back-and-forth and left-and-right directions, thus improving an operability in adjusting the half mirror.

The number of the thumb nut is reduced from two to one according to the present invention to reduce the total number of parts, thereby simplifying the structure and assembling work of a mechanism for adjusting the half mirror to reduce the cost thereof.

Various modifications will become possible for those skilled in the art after receiving the teachings of the present disclosure without departing from the scope thereof.

What is claimed is:

1. A displaying apparatus for a vehicle to display a pattern at a position in front of a driver's seat in an interior of the vehicle by projecting the pattern on the position such that the pattern is visibly overlapped with views outside a front windshield of the vehicle, comprising:

(a) a reflector member installed on a dashboard in front of the driver's seat; and (b) a projector for projecting the pattern on said reflector member, (c) said projector being provided to a ceiling in the interior of the vehicle; wherein a room lamp is provided to the ceiling in the interior of the vehicle to light up the interior, said projector being disposed within a case for receiving said room lamp.

2. The displaying apparatus as claimed in claim 1, wherein said reflector member comprises a half mirror.

3. A displaying apparatus for a vehicle to display a pattern at a position in front of a driver's seat in an interior of the vehicle by projecting the pattern on the position such that the pattern is visibly overlapped with views outside a front windshield of the vehicle, comprising:

(a) a reflector member installed on a dashboard in front of the driver's seat; and (b) a projector for projecting the pattern on said reflector member, (c) said projector being provided to a ceiling in the interior of the vehicle, further comprising;

a fitting device for slidably fitting said reflector member to the dashboard;

wherein said fitting device for fitting said reflector member comprises a vertical supporting shaft fixed to the dashboard, a horizontal shaft member having a hole through which the horizontal shaft member is rotatably engaged to the vertical supporting shaft, a reflector member fitting member rotatably and axially slidably engaged to the horizontal shaft member, a regulating member axially slidably engaged to the horizontal shaft member between the vertical supporting shaft and the reflector member fitting member, and a thumb nut fastened to a threaded portion provided at an end of the horizontal shaft member, the regulating member and the reflector member fitting member being held and fixed between the vertical supporting shaft and the thumb nut by tightening the thumb nut.

4. A displaying apparatus for a vehicle to display a pattern at a position in front of a driver's seat in an interior of the vehicle by projecting the pattern on the position such that the pattern is visibly overlapped with views outside a front windshield of the vehicle, comprising;

(a) a reflector member installed on a dashboard in front of the driver's seat;

(b) a projector arranged to a ceiling in the interior of the vehicle to project the pattern on said reflector member; and (c) a fitting device for fitting said reflector member to the dashboard such that an angle of said reflector member is freely set, (d) said reflector member being set on the dashboard at an angle in a range of 100 of 120 deg with respect to a horizontal reference plane defining 0 deg on the driver's seat side; further including a room lamp provided to the ceiling in the interior of the vehicle to light up the interior, said projector being accommodated within a case for receiving said room lamp.

5. The displaying apparatus as claimed in claim 4, wherein said reflector member comprises a half mirror.

6. In a displaying apparatus for a vehicle to display a pattern on a reflector member positioned in front of a driver's seat in the interior of said vehicle by projecting the pattern on the reflector member such that the pattern is visible overlapped with views outside a front windshield of the vehicle, a fitting device for slidably fitting the reflector member at a position in front of the driver's seat, comprising:

a vertical supporting shaft fixed at the position in front of the driver's seat in the interior of the vehicle;

a horizontal shaft member having a hole through which said horizontal shaft member is rotatably engaged to said vertical supporting shaft;

a reflector member fitting member rotatably and axially slidably engaged to said horizontal shaft member;

a regulating member axially slidably engaged to said horizontal shaft member between said vertical supporting shaft and said reflector member fitting member; and a thumb nut fastened to a threaded portion provided at an end of said horizontal shaft member, said regulating member and said reflector member fitting member being held and fixed between said vertical supporting shaft and said thumb nut by tightening said thumb nut.

* * * * *

UNITED STATES PATENT AND TRADEMARK OFFICE
CERTIFICATE OF CORRECTION

PATENT NO. : 5,056,890
DATED : October 15, 1991
INVENTOR(S) : Tadashi IINO et al It is certified that error appears in the above-identified patent and that said Letters Patent is hereby corrected as shown below:

IN THE TITLE PAGE:

Related U.S. Application Data

"Continuation of Ser. No. 283,252" should be
--Continuation of Ser. No. 182,252--.

Column 5, line 7, after "rotatably" delete ",.,".

Signed and Sealed this

Sixteenth Day of March, 1993

Attest:

STEPHEN G. KUNIN

Attesting Officer

Acting Commissioner of Patents and Trademarks